ously movable tool posts includes a system for pre-
United States Patent

Noda

[11] 4,131,836
[45] Dec. 26, 1978

[54] INTERFERENCE PREVENTION SYSTEM FOR MACHINE TOOL MOVABLE MEMBERS

[75] Inventor: Shiro Noda, Nagoya, Japan

[73] Assignee: Okuma Machinery Works Ltd., Nagoya, Japan

[21] Appl. No.: 829,519

[22] Filed: Aug. 31, 1977

[30] Foreign Application Priority Data

Sep. 10, 1976 [JP] Japan .................. 51-109036

[51] Int. Cl.$^2$ ............................................ G05B 23/02
[52] U.S. Cl. ............................ 318/565; 340/147 MT; 364/474
[58] Field of Search ............... 318/563, 565, 490, 570, 318/601; 340/147 MT; 364/474, 475

[56] References Cited

U.S. PATENT DOCUMENTS

| 3,175,190 | 3/1965 | Gasser | 318/563 X |
| 3,834,615 | 9/1974 | Watanabe | 318/565 |
| 3,836,834 | 9/1974 | Abbatiello et al. | 318/563 |
| 3,934,185 | 1/1976 | Schoonover et al. | 318/565 |

*Primary Examiner*—B. Dobeck
*Attorney, Agent, or Firm*—Jay L. Chaskin

[57] ABSTRACT

A machine tool having a plurality of independently and parallelly movable tool posts includes a system for preventing the interference between the tool posts, by means of that the information on the contour position of the tool post represented is added to the information on the position of a reference point set in for each tool post, and the results of addition are compared and calculated.

3 Claims, 8 Drawing Figures

INTERFERENCE PREVENTION SYSTEM FOR MACHINE TOOL MOVABLE MEMBERS

BACKGROUND OF THE INVENTION

1. Field of the Invention

This invention relates to an interference preventing system for machine tools, or more in particular to a system for preventing the interference between the movable members of a machine tool which are controlled to move independently and parallelly.

2. Description of the Prior Art

A conventional system for interference prevention of the machine tools concerns the interference between the tool post and the chuck of such a machine tool as lathe. This is intended to prevent the interference between a certain reference point of a single tool post such as the tool edge and a chuck disposed at a fixed position. Such a system has no means for preventing the interference between a plurality of tool posts independently and parallelly movable, as strongly demanded by users recently.

SUMMARY OF THE INVENTION

An object of the present invention is to provide a novel system for interference prevention in a machine tool by utilizing the contour positions, at each moment, of a plurality of independently and parallelly movable members.

According to the present invention, there is provided an interference preventing system in which instantaneous contour positions of the movable members to the origin of coordinates is calculated by adding with instantaneous contour designating value so that interference between the movable members is prevented by comparing the instantaneous positions of the movable members.

DESCRIPTION OF THE PREFERRED EMBODIMENTS

An embodiment of the present invention will be described below with reference to the accompanying drawings.

Figure 1:
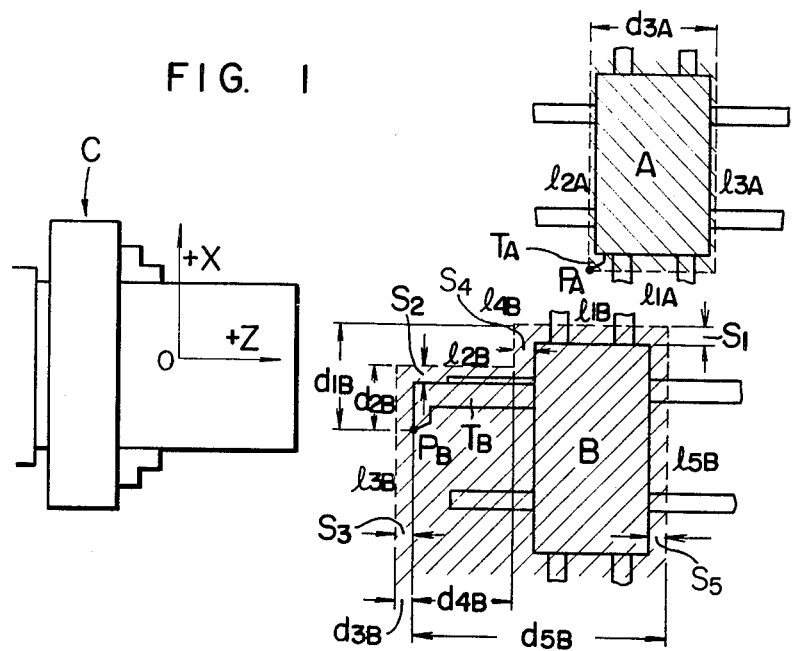
FIG. 1 is a schematic diagram showing the contours of upper and lower tool posts each including a tool edge of a lathe according to an embodiment of the invention.

A schematic diagram showing the contours of the upper and lower tool posts including tool edges of the lathe is shown in FIG. 1. In this drawing, reference character C shows a chuck, characters A and B upper and lower tool posts respectively, character O the origin, and $T_A$ and $T_B$ upper and lower tools. The region surrounded by the contour lines 11A, 12A and 13A define the contour position for the upper tool post, while the region surrounded by the contour lines 11B, 12B, 13B, 14B and 15B define the contour position for the lower tool post. In the case where the contour positions are likely to interfere with each other by erroneous information recorded in the tape or an operation error for the tape, namely, where their collision is threatened, an alarm is issued. The contours of only one of the upper and lower tool posts may have a margin or clearance. In the shown embodiment, the contour for the lower tool post has the margins S1 to S5. Hence, the wording of "contour position" means so to say a region surrounded or defined by the contour lines, and the contour position is changed in accordance with a command information from the tape at every moment, and the wording of "contour designating value" means so to say a value for define the contour position and more specifically a contour coordinate representing coordinate value of the contour lines.

Figure 2:
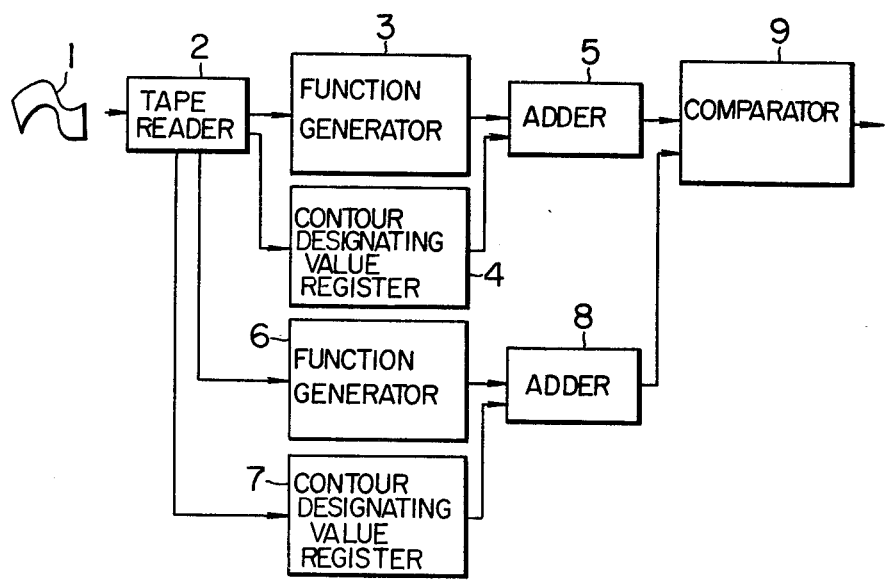
FIG. 2 is a block diagram showing a circuit of the interference prevention system according to an embodiment of the invention.
Figure 3:
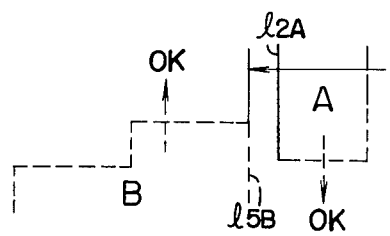
FIGS. 3, 4, 5 and 6 are diagrams showing various relative positions which may be taken by the upper and lower tool posts, for explaining the comparing and calculation functions of the comparator 9.
Figure 4A:
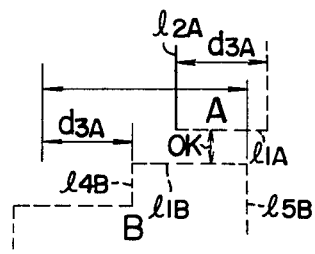
Figure 4B:
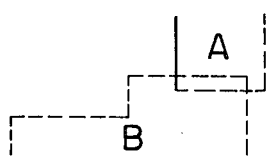

Should be noted that the coordinate value of the contour lines is determined on the basis of coordinates having the origin thereof (equal to the reference point) at the tool edge point $P_A$ or $P_B$, in contrast with the contour position being determined on the basis of coordinates having the origin O in FIG. 1. In this case, the contour coordinates are set with the tool edges $P_A$ and $P_B$ as a reference point or origin for both the upper and lower tool posts. When the X and Z coordinates are taken, as shown in FIG. 2, for the contour lines 11A, 12A and 13A of the upper tool post, the coordinates representing the contour lines 11A, 12A and 13A are X = O, Z = O and Z = d3A. In like manner, the contour lines 11B, 12B, 13B, 14B and 15B of the lower tool post are represented by the coordinates X = d1B, X = d2B, Z = d3B, Z = d4B and Z = d5B respectively.

A block diagram of the circuit of the present system according to an embodiment of the present invention is shown in FIG. 2. In this drawing, reference numeral 1 shows input tape, and numeral 2 a tape reader. Numeral 3 shows a function generator for producing an instantaneous position signal of the tool edge $P_A$ making up a reference point of the upper tool post A, that is, a command representing the position of the tool edge $P_A$ at every moment, on the basis of a target command obtained from the tape reader 2. Numeral 4 shows a contour designating value register for storing the figures of the contour designating value or coordinates X = O, Z = O, and Z = d3A of the contour lines 11A, 12A and 13A of the upper tool post A. Numeral 5 shows an adder for adding the output coordinate X = O, Z = O and Z = d3A which is an output of the contour coordinate register 4 to the instantaneous position of the tool edge $P_A$ which is an output of the function generator 3, thereby producing the positions of the contour lines 11A, 12A and 13A, i.e., the contour position of the upper tool post A at each moment. Numeral 6 shows a function generator for producing an instantaneous position command for the tool edge $P_B$ making up a reference point of the lower tool post B at each moment, on the basis of the target command issued from the tape reader 2. Numeral 7 shows a contour designating value register for storing numerical data of the commands X = d1B, X = d2B, Z = d3B, Z = d4B and Z = d5B representing the contour lines 11B, 12B, 13B, 14B and 15B respectively of the lower tool post B. Numeral 8 shows an adder for adding X = (d1B), X = (=d2B), Z (=d3B), Z (=d4B) and Z (=d5B) making up the outputs of the contour coordinate register 7 respectively to the instantaneous position of the tool edge $P_B$ which makes up the output of the function generator 6, thereby to calculate the positions of the contour lines 11B, 12B, 13B, 14B and 15B, namely, the contour position (the tool post position) of the lower tool post B at each moment. Numeral 9 shows a comparator for comparing the contour position of the upper tool post A which is an output of the adder 5 with the contour position of the lower tool post B which makes up the output of the adder 8 and thus for determining whether the contours of the upper and lower tool posts including the tool posts themselves and tool edges interfere with each other or not. When it is found that they are likely to interfere with each other, an alarm is issued from the device 9.

FIGS. 3 to 6 show various possible relative positions of the upper and lower tool posts A and B for explaining the functions of the comparator 9. Operation will be described below for each relative position.

(1) When the Z coordinate of 12A is larger than the Z coordinate of 15B, i.e., when the upper tool post is positioned to the right of the lower tool post, more precisely when the left contour line of the upper tool post is located rightward of the right contour line of the lower tool post.

According to a preprogrammed command, the comparator 9 determines that the Z coordinate of contour line 12A which is one of the contour positions applied from the adder 5 is larger than the Z coordinate of 15B which is one of the contour lines received from the adder 8. As a result, it is decided that the movement of the tool posts along X axis causes no interference between them. In this case, no alarm is issued and both the tool posts are allowed to feed freely.

(2) When the Z coordinate of 14B less d3A is smaller than or equal to the Z coordinate of 12A, and the latter is smaller than or equal to the Z coordinate of 15B. In other words, when the contour line 11A of the upper tool post A is likely to interfere with the contour line 11B of the lower tool post B along the X axis as shown in FIG. 4.

First, the comparator 9 determines that the Z coordinate of 12A which is one of the contour lines received from the adder 5 is smaller than the Z coordinate of 15B which is one of the contour lines received from the adder 8, but larger than the coordinate value of the Z coordinate of 14B which is one of the contour lines received from the adder 8, less d3A. After that, the X coordinate of 11A which is one of the contour lines received from the adder 5 is compared with the X coordinate of 11b which is one of the contour lines received from the adder 8. In the case where 11A is larger than 11B, it is normal. When 11A is equal to or smaller than 11B, on the other hand, an abnormality is determined and an alarm is issued. Then the machine is stopped.

(3) When the Z coordinate of 13B is equal to or smaller than the Z coordinate of 13A, and the latter is smaller than the Z coordinate of 14B. In other words, when the contour line 11A of the upper tool post A is likely to interfere with the contour line 12B of the lower tool post B along X axis as shown in FIG. 5.

First, the comparator 9 determines that the Z coordinate of 13A which is one of the contour lines received from the adder 5 is smaller than the Z coordinate of 14B which is one of the contour lines received from the adder 8, but larger than the Z coordinate of 13B which is one of the contour lines. After that, the X coordinate of 11A which is one of the contour lines received from the adder 5 is compared with the X coordinate of 12B which is one of the contour lines received from the adder 8. If 11A is larger than 12B, normality is determined, while if 11A is equal to or smaller than 12B, an abnormal condition is determined and an alarm is issued.

Figure 6:
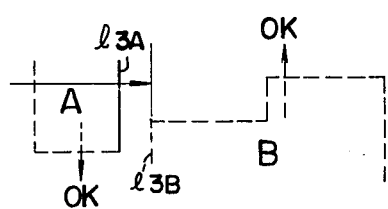

(4) When the Z coordinate of 13A is smaller than the Z coordinate of 13B. In other words, when the upper tool post A is located to the left of the lower tool post B as shown in FIG. 6.

First, the comparator 9 determines that the Z coordinate of 13A which is one of the contour lines received from the adder 5 is smaller than the Z coordinate of 13B which is one of the contour lines received from the adder 8. As a result, it is decided that the movement of the tool posts along X axis does not cause any interference between them. In this case, no alarm is issued and free movement of the tool posts is allowed.

Figure 5A:
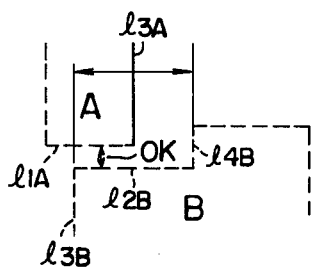
Figure 5B:
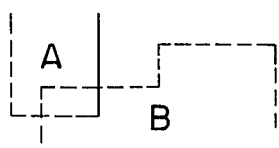

To the extent that the upper and lower tool posts are formed in the shapes shown in the embodiments described above, it suffices if the comparator 9 has the above-explained four functions of operation (1) to (4). In each of the cases (1) to (4), the relative positions of the upper and lower tool posts along the Z axis are first compared, followed comparison of their relative positions along the X axis. Quite the same effect is obtained if comparison of relative positions along the X axis is followed by that long the Z axis. Assume, for example, that the upper and lower tool posts are in relative positions along X axis as shown in FIG. 5A and that the upper tool post A moves rightward toward the lower tool post B. The contour line 13A of the upper tool post A will interfere with the contour line 14B of the lower tool post B. Considering the direction along only Z axis, this condition is equivalent to that shown in FIG. 4A. If the direction along X axis is also considered, it is equivalent to an alarming state of FIG. 4B and therefore an alarm is issued immediately. In like manner, assume that the upper and lower tool posts are in relative positions along the X axis as shown in FIG. 6 and that the upper tool post A moves rightward toward the lower tool post B. The contour line 13A of the upper tool post A interferes with the contour line 13B of the lower tool post B. When only the direction along the X axis is taken into account, this condition is equivalent to that shown in FIG. 5A. If the direction along the X axis is additionally taken into consideration, it is equivalent to the alarming state of FIG. 5B and therefore an alarm is issued immediately.

As described above, all that is required of the comparator 9 is to compare the Z or X coordinates of the upper and lower tool posts on the basis of X or Z coordinate respectively. In the configuration mentioned above, the tape and the tape reader may of course be replaced with equal effect by a digital setter. Further, the calculation speed of the adder and the comparator is set at a value sufficiently larger than the feed of the tool posts.

It will be understood from the foregoing description that according to the present invention, a machine tool having a plurality of movable members controlled to allow their independent and parallel movement is so constructed that the contour positions of the upper and lower movable members including the tool posts and tool edges are compared at each moment, thus making it possible to prevent interference between the movable members. The result is the great advantage of highly efficient machine operation without damaging the machine.

Various modifications in the structure and function of the disclosed embodiment may be made by one skilled in the art without departing from the scope of the invention as defined by the claims.

What is claimed is:

1. In a machine tool including a plurality of movable members controlled to move independently and parallelly, a movable-member interference prevention system comprising a function generator for producing a signal representing an instantaneous position of a predetermined reference point on each of said movable members, contour designating-value setting means for setting contour designating value of each of said movable members, an adder for adding the output information of said function generator to the output information of said contour designating-value setting means, said function generator, said contour designating-value setting means and said adder being provided for each of said movable members, and means for determining whether said movable members interfere with each other by comparing and calculating the output information produced from said adders.

2. A movable-member interference prevention system according to claim 1, in which said contour designating-value setting means comprises a register, and said interference-determining means comprises a comparator.

3. A movable-member interference prevention system according to claim 1, in which said contour designating-value setting means registers the coordinates of a plurality of contour lines of said movable members, said contour lines being represented on rectangular coordinates with an origin formed by said reference points on said movable members respectively.

* * * * *